No. 866,155. PATENTED SEPT. 17, 1907.
D. O. MYATT.
FARM GATE.
APPLICATION FILED JULY 25, 1907.
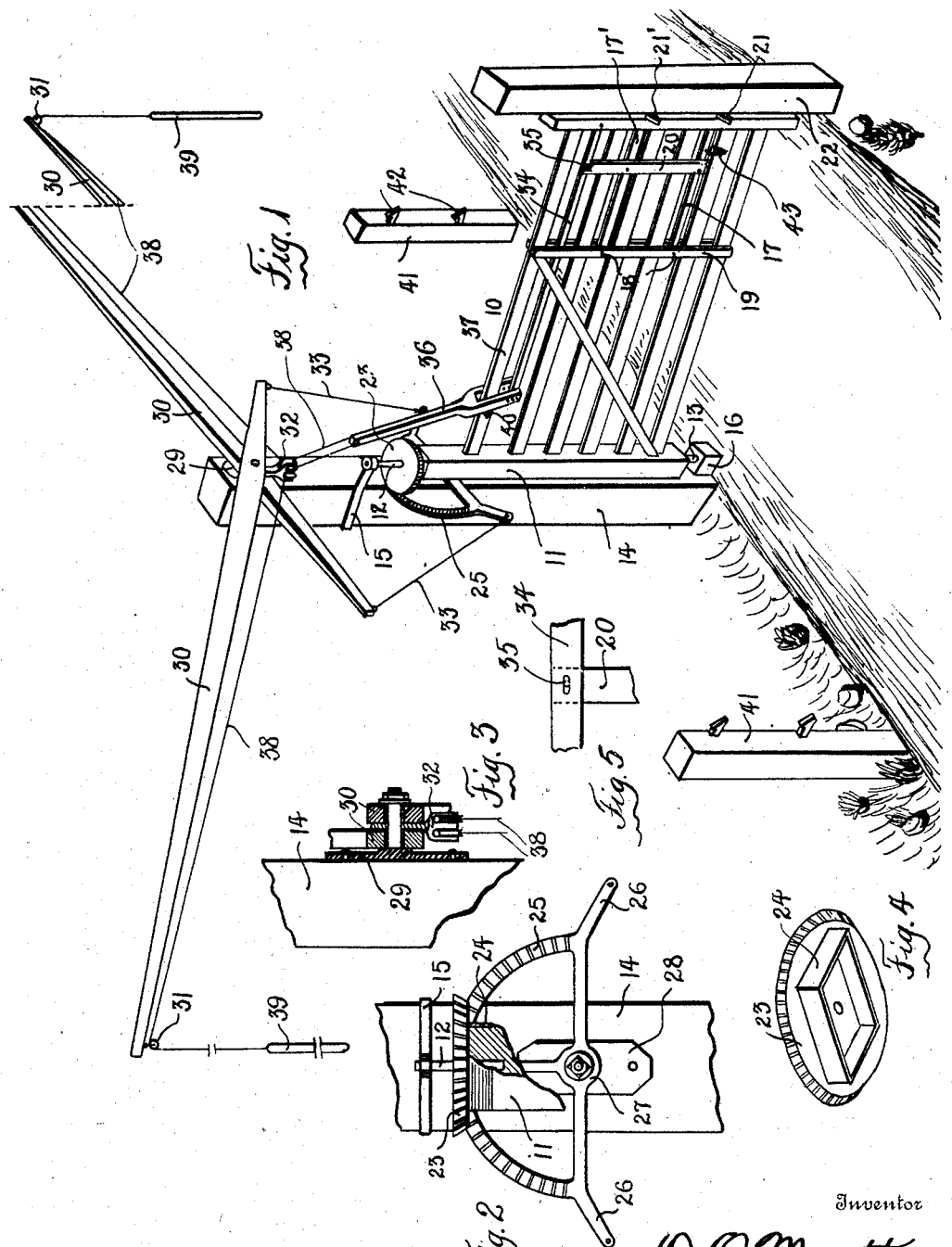

UNITED STATES PATENT OFFICE.

DEWITT O. MYATT, OF WINGO, KENTUCKY.

FARM-GATE.

No. 866,155.                Specification of Letters Patent.         Patented Sept. 17, 1907.

Application filed July 25, 1907. Serial No. 385,444.

*To all whom it may concern:*

Be it known that I, DEWITT O. MYATT, a citizen of the United States, residing at Wingo, in the county of Graves and State of Kentucky, have invented certain new and useful Improvements in Farm-Gates, of which the following is a specification.

This invention relates to farm gates, and has particular reference to that type of a gate which may be opened without the necessity of alighting from a horse or vehicle before passing through the same.

Gates of this class are frequently either too expensive or too complicated to be of practical utility, and among the several objects aimed at in the present invention are to provide a construction which is simple, cheap, and effective in practical operation.

The foregoing and other objects are attained by the mechanism hereinafter described and claimed, and illustrated in the accompanying drawings, in which:—

Figure 1 is a general perspective view of a gate constructed in accordance with the present invention, the gate proper being shown as in the closed position; Fig. 2 is an enlarged detail view of the operating mechanism for the gate, parts being broken away; Fig. 3 is a detail view of the plate on which the operating levers are pivoted and the guide block associated therewith; Fig. 4 is a detail perspective view of an operating pinion hereinafter to be described, and Fig. 5 is a detail of the latch mechanism viewed from the side of the gate opposite that shown in Fig. 1.

Similar parts are referred to in all the figures of the drawings by similar reference characters.

The numeral 10 indicates a farm gate of any ordinary or conventional construction comprising horizontal panels or bars, uprights and braces. The rear upright 11 is provided with upper and lower pivot members 12 and 13 whereby the gate is mounted on a gate post 14 so as to swing on a vertical axis laterally in either direction from the normal closed position. The upper pivot 12 is connected to the post 14 by a hook or bracket 15, and the lower pivot 13 is seated in a suitable short post or step 16.

The gate is held in normal closed position by means of a suitable latch mechanism herein indicated as comprising two latch bars 17 and 17′ pivoted as at 18 to an intermediate upright 19, and connected to each other by a stay 20 and adapted to engage with catches 21 and 21′ on the gate post 22.

Securely mounted upon the upright 11 in any suitable manner is a horizontal beveled pinion 23. Said upright 11 is usually substantially square, and as a convenient means for securing said pinion thereto, I provide the pinion with an integral flange 24 forming a socket into which the upper end of the upright is received.

The pivot member 12 passes through the center of the pinion 23 and into the upright 11. Pivoted upon the gate post 14 below the pinion 23 and adapted to mesh therewith is a gear segment 25. Said segment is of skeleton formation and is provided at each end with an outwardly and downwardly projecting arm 26, said arms extending below the horizontal plane of the pivot hub 27 of the segment.

Any suitable means such as a pivot plate 28 may be employed to secure the segment operating means to the post 14.

Pivoted upon the post 14 above the aforesaid operating segment, as upon a pivot plate 29, corresponding somewhat to the aforesaid pivot plate 28, are two operating levers 30, one of said levers projecting at right angles to the gate in one direction and the other in the opposite direction. At the outer end of each of said levers is a guide pulley 31 and suspended at the point of intersection of the levers is a pulley block 32. The inner ends of the levers 30 are connected to the outer ends of the arms 26 by short connections 33 of wire or the like.

As a convenient means for unlatching the gate I provide a bar 34 pivoted at its outer end to the outer upright of the gate and connected by a pin and slot connection 35 to the upper end of the stay 20, said bar 34 extending rearwardly to a point between the middle of the gate and the rear upright 11. Connected to the rear end of the bar 34 is a bifurcated operating bar 36, the forked end of the said bar 36 straddling the upper panel 37 of the gate. To the upper end of the bar 36 are connected two flexible connections 38 which pass through the block 32 and then severally through the guide pulleys 31 and downwardly to suitable handles 39. With the bar 36 mounted as indicated the panel 37 constitutes a substantial and convenient means for not only guiding the same in its movements but also limiting its upward and downward movements and also constitutes the principal means for holding the bar in substantially vertical position whereby the operating cords 38 are prevented from becoming injured by engagement with the operating gears. If found necessary or desirable a stop 40 may be attached to the panel 37 to prevent the bar 36 from coming into contact with the pinion 23. To insure prompt action of the latch mechanism I provide between it and the gate a suitable spring 43.

On each side of the gate is provided a suitable stop post 41 provided with catches 42 spaced to correspond with the space between the latch bars 17 and 17′, these posts 41 being provided to limit the outward swinging movement of the gate.

Having thus set forth the specific construction of my improved gate, I will now briefly describe its mode of operation.

The gate being closed and locked as illustrated in

Fig. 1, a person approaching the same from either direction may draw downwardly upon the handle 39 and thereby unlatch the gate, and a continued draft downwardly upon the handle will cause the lever 30 to swing downwardly upon its pivot, the opposite end thereof with its connection 33 causing an upward draft on the arm 26 on the side of the gate opposite to the operator whereupon the gear segment 25 will cause the pinion 23 to swing the gate in a direction away from the operator, bringing the gate against one of the stop posts 41. After passing through the gate the operator will draw downward upon the handle 39 to which he will be then adjacent causing the gate to be unlatched from the said stop post 41 and swinging the gate to its closed position, by a reversal of the operation aforesaid.

It will be understood that the specific construction of my gate mechanism may be varied in minor particulars without departing from the spirit of the invention.

Having thus described my invention, what I claim as new and desire to secure by Letters Patent of the United States, is:—

In combination with a gate post and a gate having a pivot upright and horizontal panels, a beveled pinion secured to said upright, a segment gear in mesh with said pinion and pivoted on said gate post below the horizontal plane of the pinion, said gear having end arms projecting therefrom on opposite sides of the gate, operating levers mounted on the gate post on a horizontal pivot above said gear means, connections between the inner ends of the levers and said arms, guiding devices associated with said levers, latch mechanism comprising a bifurcated bar embracing the top panel of the gate and projecting upwardly therefrom adjacent to the gear means and extending above the gear means, and flexible draft means associated with said guiding devices and connected to the upper end of said bar.

In testimony whereof I affix my signature in presence of two witnesses.

DEWITT O. MYATT.

Witnesses:
I. A. WESSON,
E. D. MULLINS.